United States Patent Office 3,375,270
Patented Mar. 26, 1968

3,375,270
4-CYCLOHEXYL AND 4-(ALKYLCYCLOHEXYL) BICYCLO[2.2.2]OCTANE-1-AMINES
Jack A. Snyder, Claymont, Del., assignor to E. I. du Pont de Nemours and Company, Wilmington, Del., a corporation of Delaware
No Drawing. Filed Sept. 24, 1965, Ser. No. 490,087
14 Claims. (Cl. 260—501.11)

This invention relates to substituted bicyclo[2.2.2]octanes. More particularly, this invention refers to novel 4-cyclohexyl and 4-(alkylcyclohexyl)bicyclo[2.2.2]octane-1-amines and their use as antidepressants.

According to the present invention I have discovered a novel class of compounds which are useful in pharmaceutical applications. Particularly, they are antidepressant agents, as shown by their ability to antagonize tetrabenazine-induced sedation in mice, to potentiate the norepinephrine pressor effect in ganglion-blocked, anesthetized dogs, and to antagonize the phenethylamine pressor effect in ganglion-blocked, anesthetized dogs.

The compounds of this invention have the formula (1)
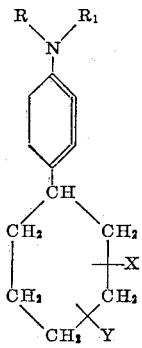

where R, $R_1$, X and Y can be the same or different and each is hydrogen, methyl or ethyl.

Also included within the scope of this invention are salts of the compounds of Formula 1. These salts have the following formula (2)
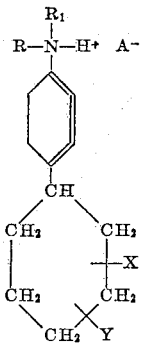

where R, $R_1$, X and Y have the same meaning as above and where A is a non-toxic anion.

Representative of the salts of Formula 2 are the hydrochloride, sulfate, phosphate, acetate, succinate, adipate, propionate, tartrate, citrate and bicarbonate. Preferred anions are those derived from hydrochloric acid, acetic acid, phosphoric acid, succinic acid, carbonic acid and citric acid.

The free amines of this invention are generally colorless, crystalline solids, soluble in polar organic solvents. They are moderately basic, comparing with the alkyl amines in this respect. The salts are usually colorless, high-melting, crystalline materials, soluble in water and insoluble in organic solvents.

The compounds of this invention can be prepared as follows:

The appropriate 4-phenylbicyclo[2.2.2]octane-1-amine, 4-(alkylphenyl)bicyclo[2.2.2]octane-1-amine or 4-(dialkylphenyl)bicyclo[2.2.2]octane-1-amine (see application S.N. 449,896, now U.S. Patent No. 3,308,160, issued Mar. 7, 1967) is hydrogenated in an inert solvent, such as dioxane, which contains dissolved ammonia. The hydrogenation is carried out at a temperature between 150° C. and 250° C., using hydrogen at 300 to 500 atm. and a hydrogenation catalyst such as 5% ruthenium on alumina. Other catalysts such as rhodium-on-charcoal or Raney nickel can be used.

The amine may be reacted with formic acid in the presence of acetic anhydride to give the formyl derivative which may be reduced to the monomethylamine by the use of lithium aluminum hydride. N-ethyl derivatives may be prepared by acetylation of the amino group with acetyl chloride or acetic anhydride, followed by lithium aluminum hydride reduction. N,N-diethyl derivatives are prepared by repeating the acetylation and reduction.

The Eschweiler-Clarke reaction with formic acid and formaldehyde is used to prepare N,N-dimethyl compounds or to prepare N-ethyl-N-methyl amines providing the N-ethyl amine is used as starting material.

The products of this invention of Formula 1 are basic in character and may be converted to their acid salts. For example, the hydrochloride is prepared by dissolving the base in an appropriate solvent such as ethanol and adding dry hydrogen chloride.

Illustrative of the compounds of this invention are the following. Nontoxic salts of these compounds are of course included as mentioned above:

4-cyclohexylbicyclo[2.2.2]octane-1-amine
N-methyl-4-cyclohexylbicyclo[2.2.2]octane-1-amine
N,N-dimethyl-4-cyclohexylbicyclo[2.2.2]octane-1-amine
N-ethyl-4-cyclohexylbicyclo[2.2.2]octane-1-amine
N-ethyl-N-methyl-4-cyclohexylbicyclo[2.2.2]octane-1-amine
N,N-diethyl-4-cyclohexylbicyclo[2.2.2]octane-1-amine
4-(2-methylcyclohexyl)bicyclo[2.2.2]octane-1-amine
4-(3-methylcyclohexyl)bicyclo[2.2.2]octane-1-amine
4-(4-methylcyclohexyl)bicyclo[2.2.2]octane-1-amine
N-methyl-(4-methylcyclohexyl)bicyclo[2.2.2]octane-1-amine
N,N-dimethyl-4-(2-methylcyclohexyl)bicyclo[2.2.2]octane-1-amine
N-ethyl-4-(3-methylcyclohexyl)bicyclo[2.2.2]octane-1-amine
4-(2-ethylcyclohexyl)bicyclo[2.2.2]octane-1-amine
4-(3-ethylcyclohexyl)bicyclo[2.2.2]octane-1-amine
4-(4-ethylcyclohexyl)bicyclo[2.2.2]octane-1-amine
4-(2,3-dimethylcyclohexyl)bicyclo[2.2.2]octane-1-amine
4-(2,4-dimethylcyclohexyl)bicyclo[2.2.2]octane-1-amine
4-(2,5-dimethylcyclohexyl)bicyclo[2.2.2]octane-1-amine
4-(2,6-dimethylcyclohexyl)bicyclo[2.2.2]octane-1-amine
4-(3,5-dimethylcyclohexyl)bicyclo[2.2.2]octane-1-amine
N-methyl-4-(2,4-dimethylcyclohexyl)bicyclo[2.2.2]octane-1-amine
4-(4-ethyl-2-methylcyclohexyl)bicyclo[2.2.2]octane-1-amine
4-(2-ethyl-6-methylcyclohexyl)bicyclo[2.2.2]octane-1-amine
4-(2,4-diethylcyclohexyl)bicyclo[2.2.2]octane-1-amine
4-(3,5-diethylcyclohexyl)bicyclo[2.2.2]octane-1-amine
N-ethyl-N-methyl-4-(2,6-diethylcyclohexyl)bicyclo[2.2.2]octane-1-amine This invention will be better understood by reference to the following illustrative examples in which parts and percentages are by weight unless otherwise indicated.

Example 1

A solution of 11.65 g. (0.058 mole) of 4-phenylbicyclo[2.2.2]octane-1-amine in 100 ml. of dioxane was placed in a shaker-tube hydrogenation apparatus of suitable size, and 10 g. of 5% ruthenium-on-alumina catalyst was added. Ten grams (0.59 mole) of ammonia gas was added, and the apparatus was pressured to 330 atm. with hydrogen. It was heated to 225° C. and held there for 1 hour, while the hydrogen pressure was kept at 330 atm. It was cooled to room temperature and vented, the hydrogenation mixture was removed, and the catalyst was filtered. The colorless filtrate was vacuum-evaporated to yield a crystalline residue of 4-cyclohexylbicyclo[2.2.2]-octane-1-amine.

This residue was dissolved in a boiling solution of 25 ml. of concentrated hydrochloric acid in 2500 ml. of water, and the solution was filtered and allowed to cool to room temperature. The crystals of 4-cyclohexylbicyclo-[2.2.2]octane-1-amine hydrochloride were filtered, washed with water, and dried in a vacuum at 70° C. The yield was 10.72 g. This was recrystallized from 100 ml. of butyl alcohol. After drying as above, the yield of colorless, crystalline 4-cyclohexylbicyclo[2.2.2]octane-1-amine hydrochloride was 7.65 g. It did not melt at temperatures below 300° C.

*Analysis.*—Calc'd. for $C_{14}H_{26}NCl$: C, 68.97; H, 10.75; N, 5.75. Found: C, 68.59; H, 10.96; N, 5.75.

Examples 2–9

Example 1 is repeated, substituting 0.058 mole of the indicated reactant for the 4-phenylbicyclo[2.2.2]octane-1-amine of that example.

| Ex. | Reactant | Product |
| --- | --- | --- |
| 2 | 4-o-tolylbicyclo[2.2.2]octane-1-amine. | 4-(2-methylcyclohexyl)-bicyclo[2.2.2]octane-1-amine hydrochloride. |
| 3 | 4-m-tolylbicyclo[2.2.2]-octane-1-amine. | 4-(3-methylcyclohexyl)-bicyclo[2.2.2]octane-1-amine hydrochloride. |
| 4 | 4-p-tolylbicyclo[2.2.2]-octane-1-amine. | 4-(4-methylcyclohexyl)-bicyclo[2.2.2]octane-1-amine hydrochloride. |
| 5 | 4-(4-ethylphenyl)bicyclo-[2.2.2]octane-1-amine. | 4-(4-ethylcyclohexyl)-bicyclo[2.2.2]octane-1-amine hydrochloride. |
| 6 | 4-(2,6-dimethylphenyl)-bicyclo[2.2.2]octane-1-amine. | 4-(2,6-dimethylcyclohexyl)-bicyclo[2.2.2]octane-1-amine hydrochloride. |
| 7 | 4-(2,4-dimethylphenyl)-bicyclo[2.2.2]octane-1-amine. | 4-(2,4-dimethylcyclohexyl)-bicyclo[2.2.2]octane-1-amine hydrochloride. |
| 8 | 4-(3-ethyl-5-methyl-phenyl)-bicyclo[2.2.2]octane-1-amine. | 4-(3-ethyl-5-methylcyclohexyl)bicyclo[2.2.2]octane-1-amine hydrochloride. |
| 9 | 4-(3,4-diethylphenyl)-bicyclo[2.2.2]octane-1-amine. | 4-(3,4-diethylcyclohexyl)-bicyclo[2.2.2]octane-1-amine hydrochloride. |

Example 10

A solution of 0.10 mole of 4-cyclohexylbicyclo[2.2.2]-octane-1-amine in 46.3 g. (1.0 mole) of 98–100% formic acid is stirred as 20.4 g. (0.20 mole) of acetic anhydride is added, keeping the temperature between 0 and 10° C. The mixture is allowed to stand 18 hours at room temperature, and is poured onto 500 g. of ice. After the ice melts, the solution is adjusted to pH 8–9 with 50% sodium hydroxide, and the precipitate of 1-formamido-4-cyclohexylbicyclo[2.2.2]octane is filtered and dried.

A 250 ml. flask with reflux condenser, drying tube and stirrer is charged with 0.10 mole of 1-formamido-4-cyclohexylbicyclo[2.2.2]octane, 100 ml. of diethylene glycol dimethyl ether, and 5.7 g. (0.15 mole) of lithium aluminum hydride. The mixture is heated and stirred for 8 hours at 60° C. and for 2 hours at 120° C. After cooling, it is treated with the calculated quantities of water and 2 N sodium hydroxide to decompose the excess lithium aluminum hydride. The insoluble aluminum salts are removed by filtration and the filtrate is dried over anhydrous potassium carbonate. The dried filtrate is saturated with hydrogen chloride gas and concentrated in vacuo to give a residue of N-methyl-4-cyclohexylbicyclo[2.2.2]-octane-1-amine hydrochloride.

Example 11

A solution of 0.10 mole of 4-cyclohexylbicyclo[2.2.2]-octane-1-amine in 75 ml. of dry pyridine is stirred while 7.85 g. (0.10 mole) of acetyl chloride is added dropwise at such a rate that the temperature does not exceed 60° C. The mixture is refluxed for ½ hour, cooled and poured into 500 ml. of cold water. The resulting precipitate is filtered, washed well with water and dried to give 1-acetamido-4-cyclohexylbicyclo[2.2.2]octane.

By using 0.10 mole of 1-acetamido-4-cyclohexylbicyclo-[2.2.2]octane for the 1-formamido-4-cyclohexylbicyclo-[2.2.2]octane of Example 10, there is obtained N-ethyl-4-cyclohexylbicyclo[2.2.2]octane-1-amine hydrochloride.

Example 12

A mixture of 0.03 mole of 4-(4-methylcyclohexyl)-bicyclo[2.2.2]octane-1-amine, 8 ml. of 98% formic acid and 5 ml. of 37% aqueous formaldehyde is heated at reflux on a steam bath for 15 hours. The mixture is cooled, 50 ml. of water and 25 ml. of 50% sodium hydroxide are added, with cooling, and it is extracted with three 25 ml. portions of ether. The ether extracts are combined, dried with potassium hydroxide pellets, and then treated with dry hydrogen chloride gas until precipitation is complete. The N,N-dimethyl-4-(4-methylcyclohexyl)bicyclo[2.2.2]octane-1-amine hydrochloride is filtered and dried.

Example 13

An ethanol solution of 0.10 mole of 4-(2-methylcyclohexyl)bicyclo[2.2.2]octane-1-amine is stirred as 0.10 mole of dry hydrogen chloride dissolved in ethanol is added. The precipitate which separates is filtered, washed with ethanol, and dried. It is 4-(2-methylcyclohexyl)bicyclo-[2.2.2]octane-1-amine hydrochloride.

Example 14

An ethanol solution of 0.10 mole of 4-(2,4-dimethyl-cyclohexyl)bicyclo[2.2.2]octane-1-amine is stirred and 0.10 mole of acetic acid is added. The solution is concentrated by vacuum evaporation and diluted with ethyl ether. The product crystallizes and is filtered, washed with ethyl ether and dried. It is 4-(2,4-dimethylcyclohexyl)bicyclo[2.2.2]octane-1-amine acetate.

Example 15

A solution of 0.10 mole of 4-(4-ethylcyclohexyl)bicyclo[2.2.2]octane-1-amine in absolute ethanol is stirred as 0.10 mole of succinic acid is added. The solution is evaporated in a vacuum to yield the crystalline 4-(4-ethylcyclohexyl)bicyclo[2.2.2]octane-1-amine succinate.

The preceding examples can be repeated substituting equivalent amounts of appropriate starting materials to obtain other compounds of this invention including those listed hereinbefore.

The compounds of this invention can be administered for antidepressant effect according to this invention by any suitable means. For example, administration can be parenterally, that is subcutaneously, intravenously, intramuscularly, or intraperitoneally. Alternatively or concurrently, administration can be by the oral route.

The dosage administered will be dependent upon age, health and weight of the recipient, the kind of concurrent treatment if any, frequency of treatment, and the nature of the effect desired. Generally, a daily dosage of active ingredient compound will be from about 0.05 to 20 mg. per kg. of body weight, although lower, such as 0.01 mg./kg., or higher amounts can be used. Ordinarily, from 0.1 to 8 and preferably 0.2 to 4 mg./kg. per day, in one or more applications per day, is effective to obtain the desired result.

The active ingredient of this invention can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use (except intravenous). In such compositions the active ingredient will ordinarily always be present in an amount of at least 0.02% by weight based on the total weight of the composition and not more than 99% by weight.

Besides the active ingredient of this invention the composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 1–50% by weight of a compound of Formula 1 or 2 and 99–50% of a carrier. In another embodiment, the active ingredient is tableted with or without adjuvants. In yet another embodiment, the active ingredient is put into powder packets and employed. These capsules, tablets and powders will generally constitute from about 1% to about 95% and preferably from 1% to 50% by weight. These dosage forms preferably contain from about 1 to about 500 mg. of active ingredient, with from about 1 to about 100 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.05% to 10%, and preferably about 0.1 to 1% by weight of the active ingredient.

As mentioned above, oral administration can be in a suitable suspension or syrup, in which the active ingredient ordinarily will constitute from about 0.02 to 10%, and preferably about 0.1 to 1% by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary illustrations above, the following examples further explain one aspect of the present invention.

*Example 16*

A large number of unit capsules are prepared for oral administration by filling standard two-piece hard gelatin capsules weighing about 30 mg. each with 5 mg. of powdered 4-cyclohexylbicyclo[2.2.2]octane-1-amine hydrochloride, 100 mg. of lactose and 0.2 mg. of "Cab-o-sil" finely divided silica.

*Example 17*

A large number of unit capsules are prepared for oral administration by filling soft gelatin capsules with a solution of 4-cyclohexylbicyclo[2.2.2]octane-1-amine in mineral oil.

*Example 18*

Example 16 is repeated except that the dosage unit is 5 mg. of active ingredient, 5 mg. of gelatin, 3 mg. of magnesium stearate and 100 mg. of mannitol, mixed and formed into a tablet by a conventional tableting machine. Slow release pills or tablets can also be used by applying appropriate coatings.

*Example 19*

A parenteral composition suitable for administration by injection is prepared by stirring 0.5% by weight of the active ingredient of Example 16 in sterile aqueous 0.9% saline.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin and Cook text mentioned above.

The above and similar examples can be carried out in accordance with the teachings of this invention, as will be readily understood by persons skilled in the art, by substitution of components and amounts in place of those specified. Thus, the foregoing detailed description has been given for clearness of understanding only, and no unnecessary limitations are to be understood therefrom.

The invention is claimed is:

1. A compound selected from the group consisting of those of the formula,

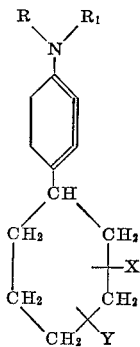

where
R, $R_1$, X and Y are selected from the group consisting of hydrogen, methyl and ethyl; and non-toxic salts of the basic compounds of said formula.

2. 4-cyclohexylbicyclo[2.2.2]octane-1-amine.

3. N-methyl - 4 - cyclohexylbicyclo[2.2.2]octane - 1-amine.

4. N,N-dimethyl - 4-cyclohexylbicyclo[2.2.2]octane-1-amine.

5. 4 - (4 - methylcyclohexyl)bicyclo[2.2.2]octane - 1-amine.

6. 4 - (2,4-dimethylcyclohexyl)bicyclo[2.2.2]octane-1-amine.

7. 4 - (2,6-dimethylcyclohexyl)bicyclo[2.2.2]octane-1-amine.

8. The hydrochloride of the compound set forth in claim 2.

9. The hydrochloride of the compound set forth in claim 3.

10. The hydrochloride of the compound set forth in claim 4.

11. The hydrochloride of the compound set forth in claim 5.

12. The hydrochloride of the compound set forth in claim 6.

13. The hydrochloride of the compound set forth in claim 7.

14. The acetate of the compound set forth in claim 2.

References Cited

Roberts et al.: J. Am. Chem. Soc., 75, 637 (1953).

CHARLES B. PARKER, *Primary Examiner.*

P. C. IVES, *Assistant Examiner.*